United States Patent Office 3,704,281
Patented Nov. 28, 1972

3,704,281
MOLDING MATERIALS BASED ON EPOXIDE
COMPOUNDS AND PROCESS
Herbert Saran and Manfred Budnowski, Dusseldorf-Holthausen, Germany, assignors to Henkel & Cie. GmbH, Dusseldorf-Holthausen, Germany
No Drawing. Continuation of abandoned application Ser. No. 753,782, Aug. 19, 1968. This application Mar. 8, 1971, Ser. No. 122,174
Claims priority, application Germany, Sept. 2, 1967, H 63,774
Int. Cl. C08g 30/02, 30/12, 30/14
U.S. Cl. 260—77.5 NC                          4 Claims

ABSTRACT OF THE DISCLOSURE

This invention relates to a hardenable molding material based on organic compounds containing more than one epoxide group in the molecule consisting of (1) a prereaction product of (a) a mixture of organic compounds containing more than one epoxide group in the molecule, said mixture containing from 66⅔% to 100% of crystalline triglycidyl isocyanurate, and (b) an amine in such a proportion that from 8% to 30% of the epoxide groups in said mixture of organic compounds is reacted with the amine groups of said amine and (2) an epoxide resin hardener. The invention also relates to the process of preparing said prereaction product and the hardened epoxide resin produced from said molding material.

REFERENCE TO PRIOR APPLICATION

This application is a continuation of United States patent application Ser. No. 753,782, filed Aug. 19, 1968, and now abandoned.

THE PRIOR ART

It is known to subject mixtures of epoxide compounds, hardeners and fillers, which are to be used as molding materials, to a controlled prior reaction. By this the processing properties, such as the flowability, of the molding material may be influenced.

However, mostly products of only a limited storability are obtained in this way.

If this method is applied to the products of molding materials based on triglycidyl isocyanurate, materials are thereby obtained which cannot be stored for long.

Furthermore, it is known to obtain more stable materials by physically mixing a solid epoxide resin, solid amine or acid anhydride epoxide resin hardeners and solid fillers. When this method is used for the production of molding materials based on triglycidyl isocyanurate, however, the initial viscosity of the organic phase of the hardenable mass is so low that it is partly pressed out of the casting mold during the molding step.

OBJECTS OF THE INVENTION

An object of the present invention is the obtention of a molding material based on triglycidyl isocyanurate which has both a high initial viscosity at molding temperatures and a prolonged storability at room temperature.

Another object of the invention is the obtention of a hardenable molding material based on organic compounds containing more than one epoxide group in the molecule consisting of (1) a prereaction product of (a) a mixture of organic compounds containing more than one epoxide group in the molecule, said mixture containing from 66⅔% to 100% of crystalline triglycidyl isocyanurate, and (b) an amine in such a proportion that from 8% to 30% of the epoxide groups in said mixture of organic compounds is reacted with the amine groups of said amine and (2) an epoxide resin hardener.

A further object of the invention is the development of a process for the obtention of the above molding material as well as the hardened epoxide resin produced from the above molding material on hardening.

These and other objects of the invention will become more apparent as the description thereof proceeds.

DESCRIPTION OF THE INVENTION

These objects of the invention in the preparation of a hardenable molding material based on organic compounds containing more than one epoxide group in the molecule consisting of (1) a prereaction product of (a) a mixture of organic compounds containing more than one epoxide group in the molecule, said mixture containing from 66⅔% to 100% of crystalline triglycidyl isocyanurate, and (b) an amine, in such a proportion that from 8% to 30% of the epoxide groups in said mixture of organic compounds is reacted with the amine groups of said amine and (2) an epoxide resin hardener.

The triglycidyl isocyanurate, to be used according to the process of the invention, should be present in solid form. Preferably, the triglycidyl isocyanurate should be crystallized and should have an epoxide-oxygen content of at least 14%. The preparation of the solid as well as the crystallized triglycidyl isocyanurate is well known as such. By treatment, possibly repeated, of the crude reaction product, which is obtained, for example, by the reaction of cyanuric acid with an excess of epichlorohydrin, with an alkali metal hydroxide, a suitable triglycidyl isocyanurate can be obtained. By means of one or repeated recrystallizations from suitable solvents, such as methanol, the preferred crystalline triglycidyl isocyanurate can be obtained from the crude products, having a content of more than 14% of epoxide oxygen. Processes for preparing these products are described in U.S. Pat. No. 3,337,509 and No. 3,288,789.

For the production of the molding materials according to the invention, both aromatic and aliphatic amines may be used. Aromatic amines which may be used are, for example, the isomeric toluidines, β-naphthylamine, the isomeric phenylenediamines, benzidine, 3,3′-dimethoxybenzidine, chloraniline, dichloraniline, chlorinated benzidines, 4,4′-diaminodiphenylmethane, 3,3′-dimethoxy-4,4′-diamino-diphenylmethane, 3,3′-dichloro - 4,4′ - diaminodiphenylmethane, 4,4′-diamino - 3,3′-5,5′ - tetrabromodiphenylmethane, 4,4′ - diaminodiphenyloxide, diaminodiphenylsulphide, diaminodiphenylsulphone, or N-(hydroxypropyl)-m-phenylenediamine. Among the aforesaid amines, those which contain two primary amino groups are preferred, especially diaminodiphenylmethane, dichlorodiaminodiphenylmethane and diaminodiphenylsulphone.

Aliphatic amines which may be used are, for example, ethylenediamine, propylenediamine, butylenediamine, diethylenetriamine, triethylenetetramine, diaminocyclohexane, N-(4-hydroxybenzyl)-triethylenetetramine, and also piperazine, N-(2-aminoethyl)-piperazine and the condensation products containing free amino groups from dimerized fatty acids and polyamines, such as are known, for example by the trade name "Versamide."

For the preparation of the prereaction products, the proportion of triglycidyl isocyanurate to amine is chosen so that 8 to 30%, especially 12 to 22% of the amine needed for the complete reaction is allotted to each epoxide group in the molecule. For this purpose the two reactants are melted and, after thorough mixing, are kept for about ½ to 10 hours at 80° to 150° C. After that, all the amino groups have reacted. Then the prereaction product is allowed to cool and is comminuted. The temperature and time of the reaction are dependent on the reactivity of the components used.

The prereaction product so obtained is then mixed with the amount required for the complete cross-linking, of epoxide resin hardeners, i.e. compounds forming poly-adducts with epoxide compounds or compounds which catalyze the ring-opening polymerisation of epoxide compounds. The same aromatic amines which were enumerated above may be used as poly-adduct-forming compounds or epoxide resin hardeners. Further, the organic carboxylic acid anhydrides known as epoxide resin hardeners or poly-adduct-forming compounds are used such as, the dicarboxylic acid anhydrides and the polycarboxylic acid polyanhydrides. Among these are, for example hexahydrophthalic acid anhydride, tetrahydrophthalic acid anhydride, phthalic acid anhydride, methylcyclohexanedicarboxylic acid anhydride, dodecenylsuccinic acid anhydride, pyromellitic acid anhydride, endomethylenetetrahydrophthalic acid anhydride, methylendomethylenetetrahydrophthalic acid anhydride, etc.

Favorable results are obtained when the molding materials contain, as epoxide resin hardeners, compounds with free amino groups or carboxylic acid anhydride groups, which are reaction products of triglycidyl isocyanurate with amines or carboxylic acid anhydrides, in which the proportion of triglycidyl isocyanurate to amine or carboxylic acid anhydride is chosen so that 5 to 30% of the epoxide groups needed for the complete reaction are allotted to one amino group or one carboxylic acid anhydride group.

For the preparation of these reaction products from excess amount of aromatic amines or organic carboxylic acid anhydrides, the procedure is just like the previously described preparation of the reaction products from triglycidyl isocyanurate and less than the stoichiometric amounts of amines.

The molding materials according to the invention may in some circumstances also contain epoxide resin hardening accelerators, such as for example, benzyldimethylamine, trimethylbenzylammonium chloride, tris-(dimethylamino)-phenol or triphenylphosphine or also dicyanodiamide. The latter is suitably used in an amount of 0.5 to 5%, based on the triglycidyl isocyanurate.

Fillers may also be used in known way for the production of the molding materials, as for example, ground shale, ground steatite, asbestos powder or asbestos fibers, glass powder or glass fibers, barium sulphate, mica, kaolin, quartz powder, titanium oxide, aluminum oxide, ground dolomite, calcium carbonate of other natural or synthetic fibrous materials, etc. If so desired, metal powders such as aluminum, iron, titanium or the like, may also be incorporated in the molding materials. Moreover, known lubricants, stabilizers, dyestuffs or plasticizers are suitably added if desired.

The molding materials according to the invention based on triglycidyl isocyanurate may also be modified by addition of other organic compounds containing more than one epoxide group in the molecule. These epoxides can replace the triglycidyl isocyanurate up to about ⅓ of the total epoxide compounds present. Diglycidyl ethers of polyhydric phenols, for example the diglycidyl ether of diphenylolpropane with an epoxide equivalent of 170 to 1200, are suitable for the said purpose. Moreover, cycloaliphatic epoxide compounds are suitable as for example, 3,4-epoxy-6-methyl-hexahydrobenzyl 3',4'-epoxy-6'-methylhexahydrobenzoate or the diepoxide of the acetal of cyclohexenealdehyde and 1,1-dimethylolcyclohexene, or diglycidylaniline.

After mixing these ingredients in known mixers, as for example, ball mills, pinned disc mills and the like, a pourable powder is mostly present, which can be directly molded. In many cases it is expedient, however, to prepare therefrom granulates, tablets or small plates.

The molding materials according to the invention are marked by an excellent stability, and can usually be kept for more than a year at room temperature.

The final processing of the molded materials is effected in the known ways by compression molding or transfer molding. The temperature during the molding operation is adjusted to between about 130° C. and 200° C., and the pressure is adjusted to between 30 and 400 kg./cm.$^2$. The molding operation requires 1 to 20 minutes, according to the temperature employed. In order to be sure that the final properties of the molded articles are actually obtained, it may be expedient to temper them subsequently for some time at a temperature of 150° to 220° C. for example.

Molded articles with good mechanical, thermal and electrical properties are obtained from the molding materials according to the invention.

The following examples serve to illustrate the invention. It is to be understood, however, that they are not to be deemed limitative in any manner.

EXAMPLES

The crystalline triglycidyl isocyanurate used in the examples was a technical mixture of the high- and low-melting forms and had an epoxide-oxygen content of 15.5%, such as described in U.S. Pat. No. 3,337,509. The measured values indicated were found according to the directions in DIN 53,458, DIN 53,452 and DIN 53,453.

EXAMPLE 1

115 g. of triglycidyl isocyanurate and 15 g. of 3,3'-dichloro-4,4'-diaminodiphenylmethane were reacted at 150° C. for 5 hours and, after cooling, the product was comminuted. It was mixed with 53 g. of diaminodiphenylsulphone, 427 g. of ground shale and 18 g. of calcium stearate in a ball mill to obtain a molding powder. Standard bars were molded from the molding powder at 165° C. and 100 kp./cm.$^2$ in 20 minutes and were tempered for 20 hours at 160° C. The following values were measured:

Martens temperature: 219° C.
Flexural strength: 760 kp./cm.$^2$
Impact strength: 4.6 kg. cm./cm.$^2$ The molding powder could be stored for over a year.

EXAMPLE 2

115 g. of triglycidyl isocyanurate and 15 g. of 3,3'-dichloro-4,4'-diaminodiphenylmethane were reacted at 150° C. for 5 hours and, after cooling, the product was comminuted.

60.4 g. of diaminodiphenylsulphone and 9.6 g. of triglycidyl isocyanurate were reacted at 170° C. for 4 hours and pulverized after cooling to obtain an epoxide resin hardener. The two powders were well mixed with 468 g. of ground shale and 20 g. of calcium stearate to obtain a molding powder. This molding powder was molded into standard bars at 160° C. and 100 kp./cm.$^2$ in 10 minutes. After tempering for 20 hours at 160° C., the following values were measured:

Martens temperature: 212° C.
Flexural strength: 820 kp./cm.$^2$
Impact strength: 4.6 kp. cm./cm.$^2$ The molding powder could be stored for over a year.

EXAMPLE 3

88.4 g. of crystalline triglycidyl isocyanurate were reacted with 6.6 g. of 4,4'-diaminodiphenylmethane at 150° C. for 10 hours and comminuted after cooling. The powder was mixed with 442 g. of ground shale, 95 g. of tetrahydrophthalic acid anhydride and 3.2 g. of calcium stearate, and compressed into tablets of 12 mm. in diameter and 3 mm. in thickness.

Standard bars were molded from these tablets at 165° C. in 5 minutes and were tempered at 180° C. for 20 hours. The following values were measured:

Martens temperature: 243° C.
Flexural strength: 870 kp./cm.$^2$
Impact strength: 5.0 kp. cm./cm.$^2$ The tablets could be stored for more than 10 months.

EXAMPLE 4

510 g. of crystalline triglycidyl isocyanurate were mixed with 40 g. of 4,4'-diaminodiphenylmethane and the mixture was heated for 6 hours at 150° C. After cooling, the fused mass was pulverized.

Also 586 g. of tetrahydrophthalic acid anhydride were admixed with 32 g. of the same triglycidyl isocyanurate and the mixture was heated for 3 hours at 150° C. After cooling, this fused mass was also comminuted and pulverized to obtain an epoxide resin hardener.

1.7 kg. of ground shale and 30 g. of calcium stearate were added to the two pulverized prereaction products, and after thorough mixing, tablets of 12 mm. diameter and 3 mm. thickness were made.

The molded tablets thus produced could be stored at ordinary room temperature for over a year without loss of molding properties.

From the tablets made as described above, rods of dimensions 120 x 15 x 10 mm. were molded at a temperature of 165° C. and a pressure of 100 kp./cm.$^2$ for 5 minutes, which were then tempered at 180° C. for 20 hours.

The following average values were measured on various test samples:

Martens temperature: 204° C.
Flexural strength: 810 kp./cm.$^2$
Impact strength: 6.2 kp. cm./cm.$^2$

EXAMPLE 5

145 g. of triglycidyl isocyanurate and 4.8 g. of diethylenetriamine were reacted for 45 minutes at 150° C. and comminuted after cooling. The powder was ground and mixed with 60 g. of diaminodiphenylsulphone, 490 g. of ground shale and 21 g. of calcium stearate in a ball mill to obtain a molding powder.

Standard bars were molded therefrom at 165° C. and 100 kp./cm.$^2$ pressure in 10 minutes and were tempered at 160° C. for 20 hours. The following values were measured:

Martens temperature: 215° C.
Flexural strength: 720 kp./cm.$^2$
Impact strength: 4.1 kp. cm./cm.$^2$ The storability of the molding powder amounted to more than 10 months.

The preceding specific embodiments are illustrative of the practice of the invention. It is to be understood, however, that other expedients known to those skilled in the art may be employed without departing from the spirit of the invention.

We claim:

1. A hardenable molding material based on organic compounds containing more than one epoxide group in the molecule consisting of (1) a pulverized prereaction product, produced by a reaction conducted at temperatures above the melting point of the ingredients until substantially all the amino groups have reacted, of (a) crystalline triglycidyl isocyanurate, and (b) aromatic polyamines, in such a proportion that from 8% to 30% of the total amount of the epoxide groups in said triglycol isocyanurate is reacted with the amine group of said polyamine and (2) an epoxide resin hardener in such amount as required for the complete cross-linking of said prereaction product selected from the group consisting of aromatic polyamines, organic carboxylic acid anhydride epoxide resin hardeners and pulverized prereaction products, produced by a reaction conducted at temperatures above the melting point of the ingredients until substantially all the epoxide groups have reacted, of (a) crystalline triglycidyl isocyanurate and (b) an epoxide resin hardener selected from the group consisting of aromatic polyamines and organic carboxylic acid anhydrides, in such a proportion that from 5% to 30% of the total amount of the epoxide groups required for the complete reaction are allotted to one amino group or one carboxylic acid anhydride group in said epoxide resin hardener.

2. The hardenable molding material as defined in claim 1 wherein, in said component (1), said polyamine is present in such a proportion that from 12% to 22% of the total amount of the epoxide groups is reacted with the amine groups of said polyamine.

3. The hardenable molding material as defined in claim 1, wherein, in said component (1), said polyamine is an aromatic polyamine having two primary amine groups.

4. The hardenable molding material as defined in claim 1, wherein said epoxide resin hardener is said prereaction product of crystalline triglycidyl isocyanurate and an epoxide resin hardener.

References Cited

UNITED STATES PATENTS

| | | | |
|---|---|---|---|
| 3,538,039 | 11/1970 | Lantz | 260—37 EP |
| 3,533,985 | 10/1970 | Lantz | 260—37 EP |
| 3,518,220 | 6/1970 | Landua | 260—2 N |
| 3,409,591 | 11/1968 | Landua | 260—2 N |
| 3,280,054 | 10/1966 | Gotze | 260—18 PN |

DONALD E. CZAJA, Primary Examiner

C. W. IVY, Assistant Examiner

U.S. Cl. X.R.

260— 2 EC, 2 N, 18 EP, 18 PN, 37 EP, 78.4 EP